(12) United States Patent
Shaffer et al.

(10) Patent No.: US 11,597,335 B1
(45) Date of Patent: *Mar. 7, 2023

(54) VEHICLE ACCESSORY BRACKET

(71) Applicants: Sam Shaffer, Cambridge, IA (US); Zach Kowalik, Huxley, IA (US); Luke Shaffer, Ames, IA (US)

(72) Inventors: Sam Shaffer, Cambridge, IA (US); Zach Kowalik, Huxley, IA (US); Luke Shaffer, Ames, IA (US)

(73) Assignee: ORIGINAL APPEARANCE MANUFACTURING, LLC, Huxley, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/342,519

(22) Filed: Jun. 8, 2021

Related U.S. Application Data

(63) Continuation of application No. 16/515,010, filed on Jul. 17, 2019, now Pat. No. 11,027,672.

(60) Provisional application No. 62/699,682, filed on Jul. 17, 2018.

(51) Int. Cl.
*B60R 13/04* (2006.01)

(52) U.S. Cl.
CPC .................... *B60R 13/04* (2013.01)

(58) Field of Classification Search
CPC .. B60R 13/04; B60R 13/043; B60R 2013/046
See application file for complete search history.

(56) References Cited

U.S. PATENT DOCUMENTS

| 6,811,210 | B2 * | 11/2004 | Granger | B62D 29/048 24/297 |
| 7,461,876 | B1 * | 12/2008 | Atkinson | B60R 13/04 293/128 |
| 7,665,795 | B2 * | 2/2010 | Shishikura | B62D 35/02 296/180.1 |
| 8,322,110 | B2 * | 12/2012 | Chou | B60R 13/04 52/312 |
| 8,641,135 | B2 * | 2/2014 | Palmer | B60R 13/04 296/209 |
| 11,027,672 | B1 * | 6/2021 | Shaffer | B60R 13/04 |
| 2012/0086238 | A1 * | 4/2012 | Tan | B62D 25/025 296/209 |

* cited by examiner

*Primary Examiner* — John D Walters
(74) *Attorney, Agent, or Firm* — Hamilton IP Law, PC; Jay R. Hamilton; Charles A. Damschen

(57) ABSTRACT

A vehicle accessory bracket for use in automotive applications that attaches to an existing interior structure of the vehicle, including but not limited to, inner rocker panels on pickup trucks, pinch welds on wheel openings, and bumper mounting points. The vehicle accessory bracket is also designed to provide a proper mounting surface for the rocker accessory. The vehicle accessory bracket for use in automotive applications is disclosed herein comprising a longitudinal body, a rib and an opening for engaging and mounting to the existing structure of the vehicle. The vehicle accessory bracket can be used to cover up rusty/unsightly blemishes on vehicles, especially rocker panels on pickup trucks as disclosed herein.

18 Claims, 10 Drawing Sheets

VEHICLE ACCESSORY BRACKET

CROSS REFERENCE TO RELATED APPLICATIONS

The present application claims priority from non-provisional U.S. patent application Ser. No. 16/515,010 filed on Jul. 17, 2019 (issued as U.S. Pat. No. 11,027,672) which claimed priority from utility provisional U.S. Pat. App. No. 62/699,682 filed on Jul. 17, 2018, all of which are incorporated by reference herein in their entireties.

FIELD OF THE INVENTION

The present disclosure relates to a vehicle accessory bracket for use in automotive applications, and in particular it relates to the attachment of a vehicle bracket to the existing structure of the vehicle proximate a vehicle panel to provide support for mounting an accessory, as shown and disclosed herein.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. § 1.171 (c)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

The present disclosure relates to a vehicle accessory bracket for use in automotive applications that attaches to the existing structure of the vehicle proximate the inner panels of a vehicle such as pickup truck rocker panels, pinch welds on wheel openings, cab transitions and bumper mounting points, subject to the particular user need and application. In the past, there are numerous automotive accessories on the market designed for use as exterior body covers for aesthetic appearances. However, prior art covers of this type are usually characterized by a number of undesirable features which limit their utility such as a lack of compactness, inability to cover unsightly scratches, dents, rust, or other imperfections and a high cost of manufacture. As disclosed, the present disclosure is directed to a vehicle accessory bracket for use with vehicles to provide a proper and improved mounting surface for the accessory which may be configured as a cover to quickly improve the aesthetic of the vehicle, particularly when used to cover up rusty/unsightly blemishes on vehicles. Rocker panels on pickup trucks are well known to rust and deteriorate and thus provide an exemplary application of the present disclosure, without limitation or restriction.

DETAILED DESCRIPTION—BRIEF DESCRIPTION OF DRAWINGS

Figure 4A:
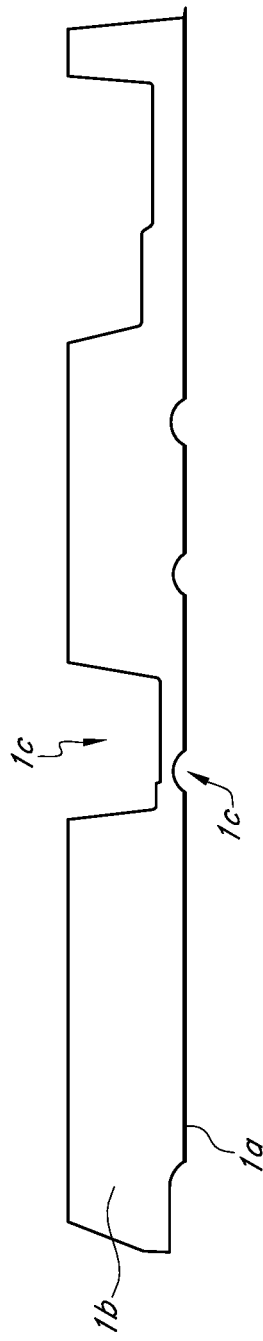
FIG. 4A is a perspective view of an inner bracket which may be mounted or installed to an existing inner structure of the vehicle as disclosed herein.
Figure 4B:
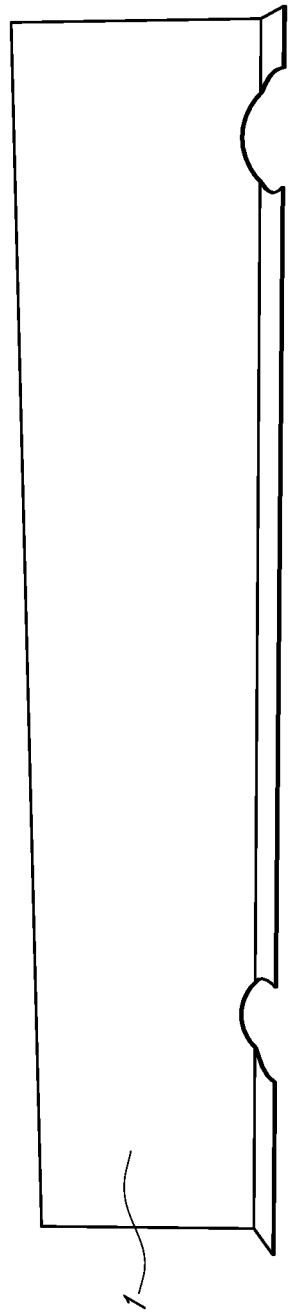
Figure 5:
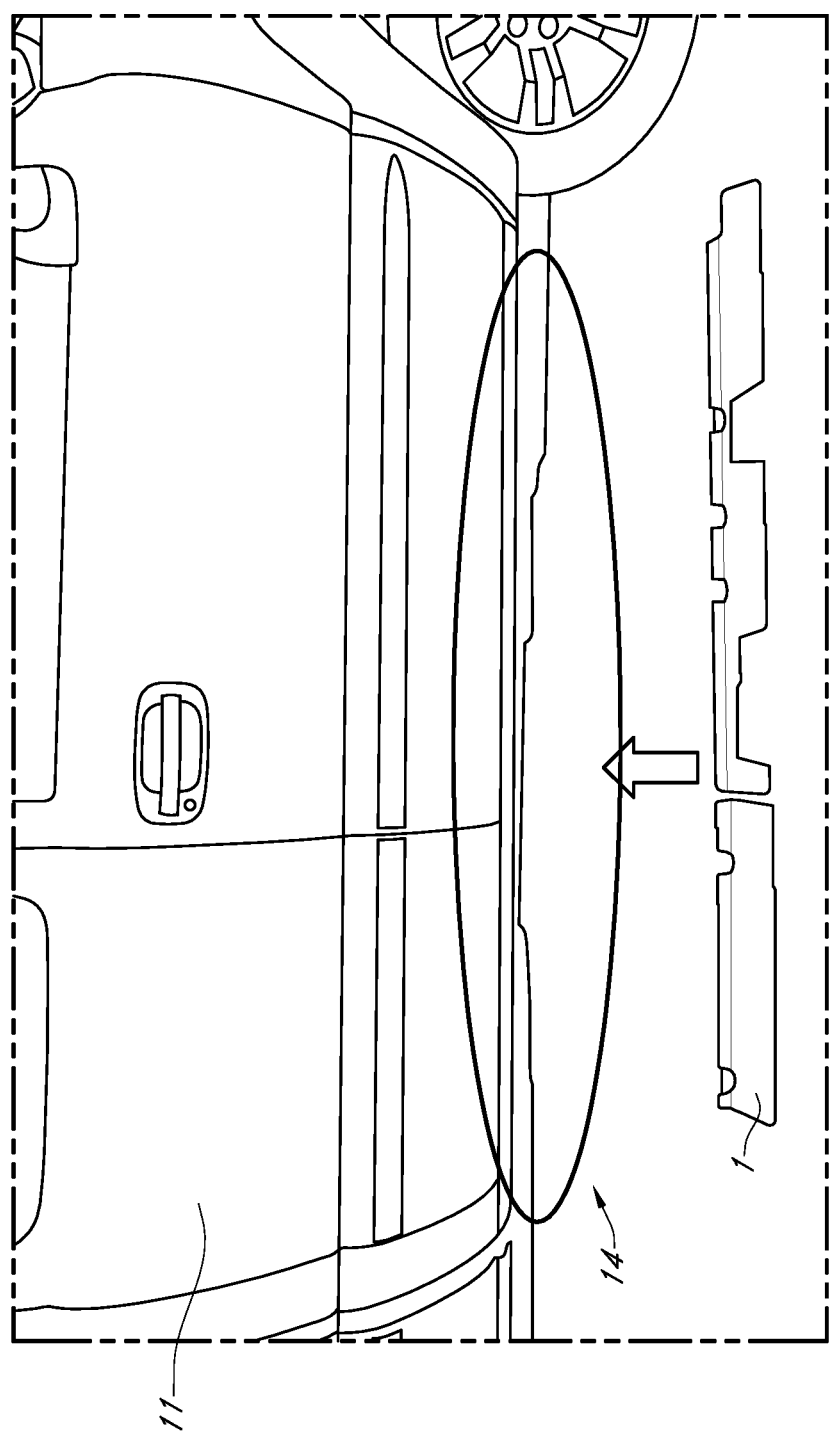

FIG. 4B is another perspective view of an inner bracket which may be mounted or installed to an existing inner structure of the vehicle as disclosed herein FIG. 5 is a perspective view of the inner brackets of FIGS. 4A and 4B which may be mounted or installed to an existing rusted inner structure of a vehicle (shown in arrow with vehicle as a truck) to replace the rusted area (shown in circle) as disclosed herein.

Figure 6:
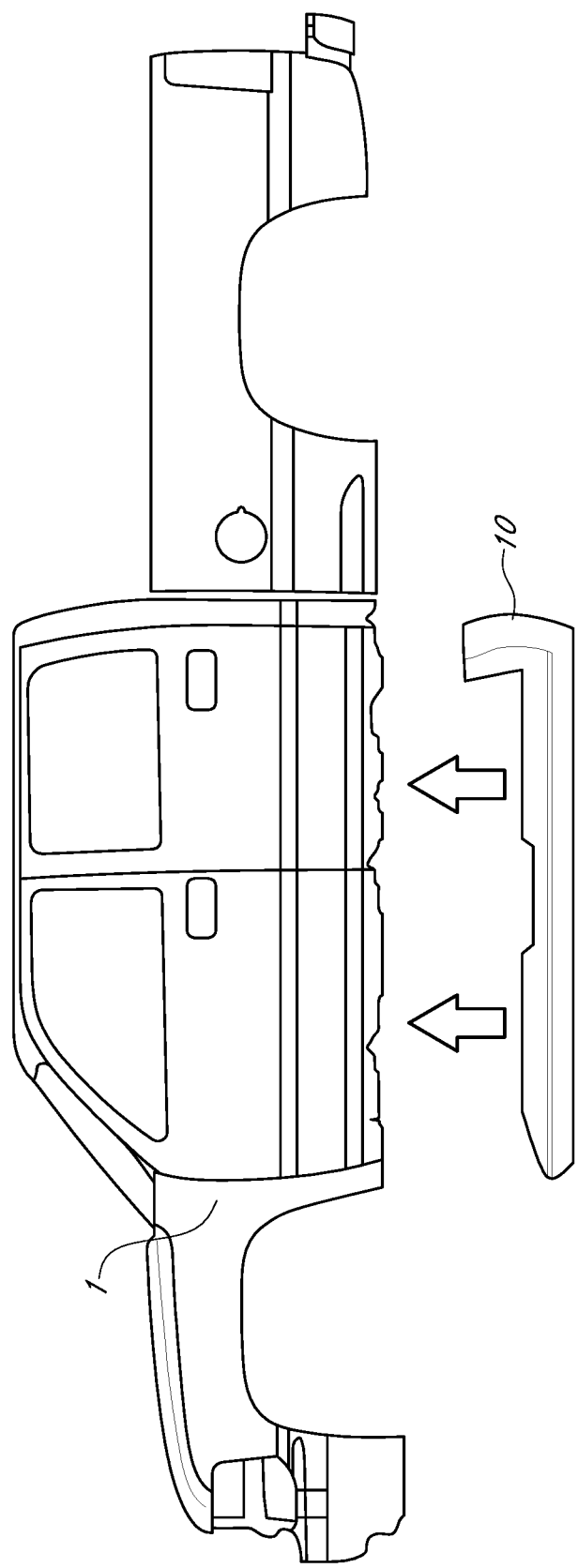

FIG. 6 is a demonstrative view of the method on installing a vehicle bracket to an existing structure of a vehicle as disclosed herein.

Figure 7A:
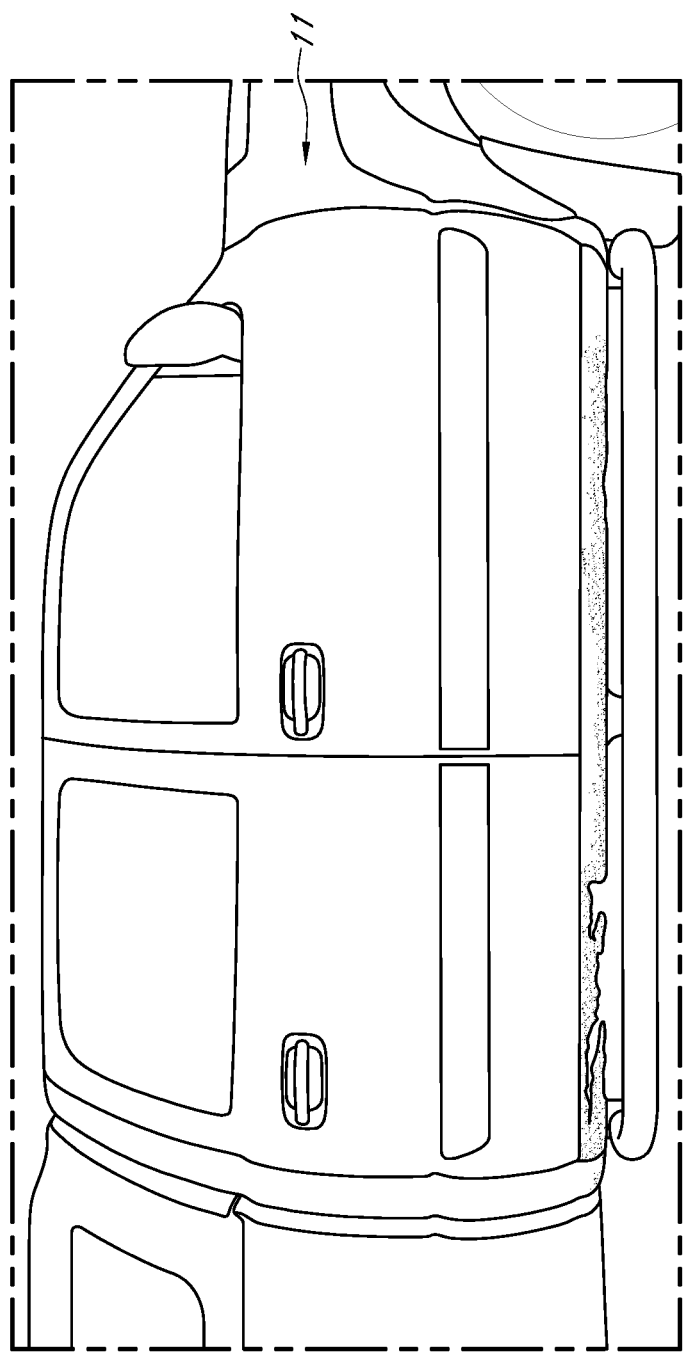

FIG. 7A is a perspective view of an existing structure of a vehicle (truck) before the installation of the accessories wherein the bracket was installed or mounted to the bottom of the vehicle as disclosed herein.

Figure 7B:
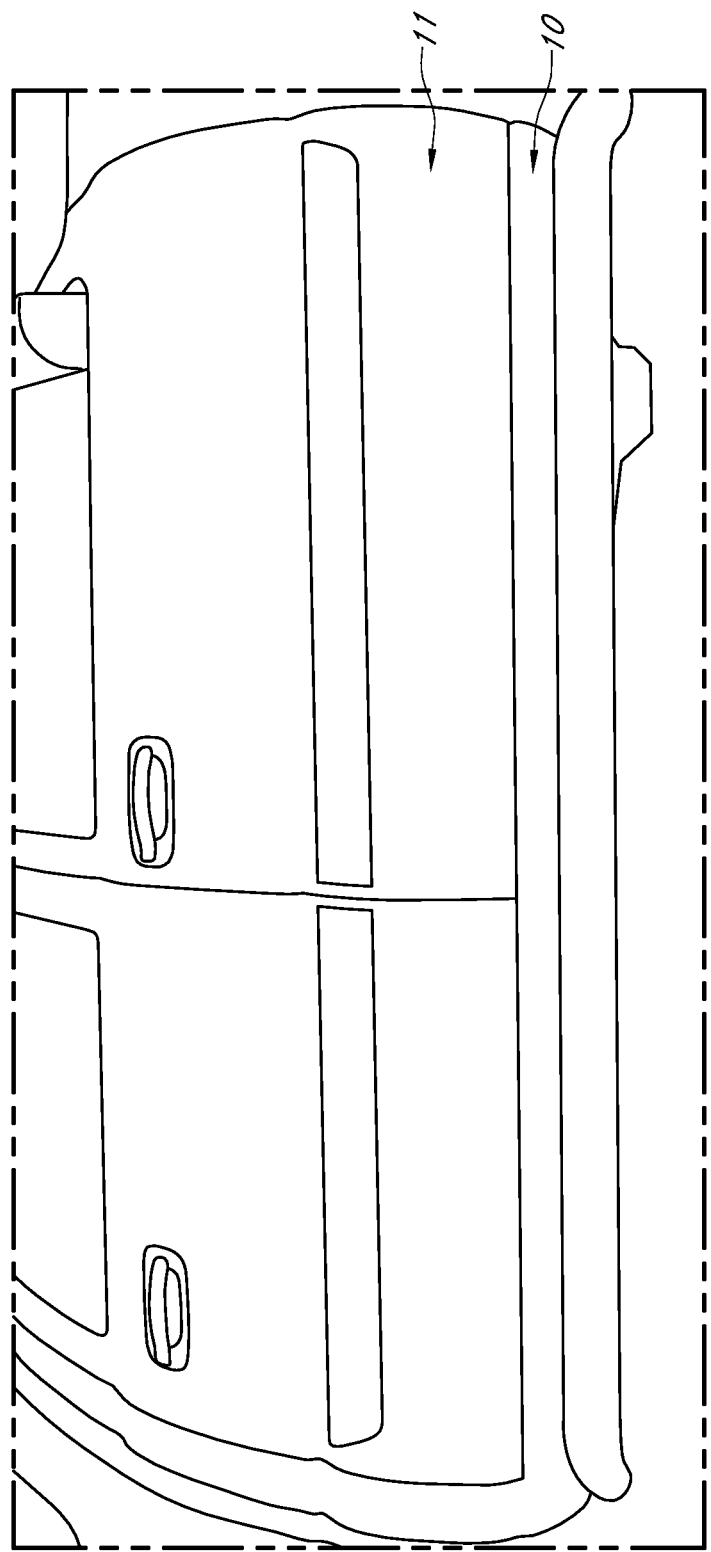

FIG. 7B is a perspective view of an existing structure of the vehicle (truck) after the installation of the accessories wherein the bracket was installed or mounted to the bottom of the vehicle as disclosed herein.

Figure 8:
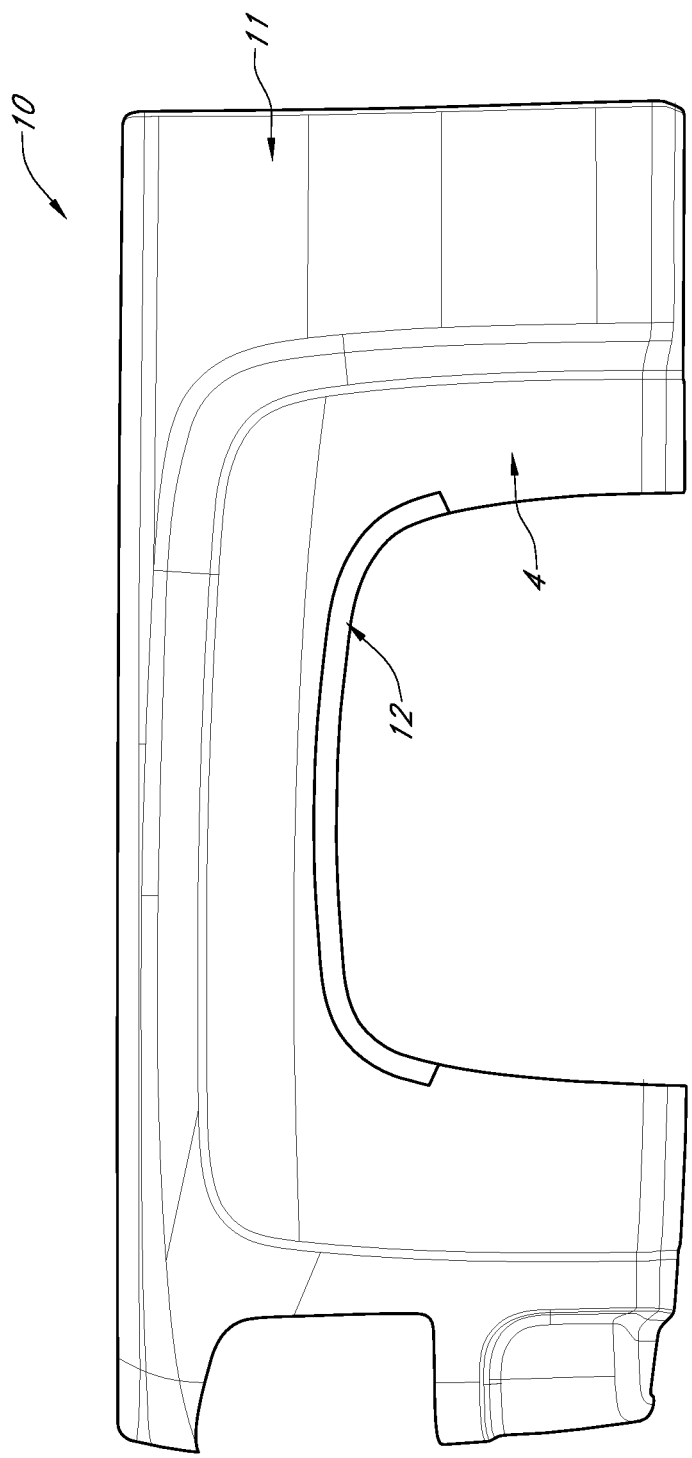

FIG. 8 is a front view of a bracket wherein the bracket may be referred to as a fender flare bracket and may be installed proximate the flared fenders on the side of a truck bed as disclosed herein.

Figure 9:
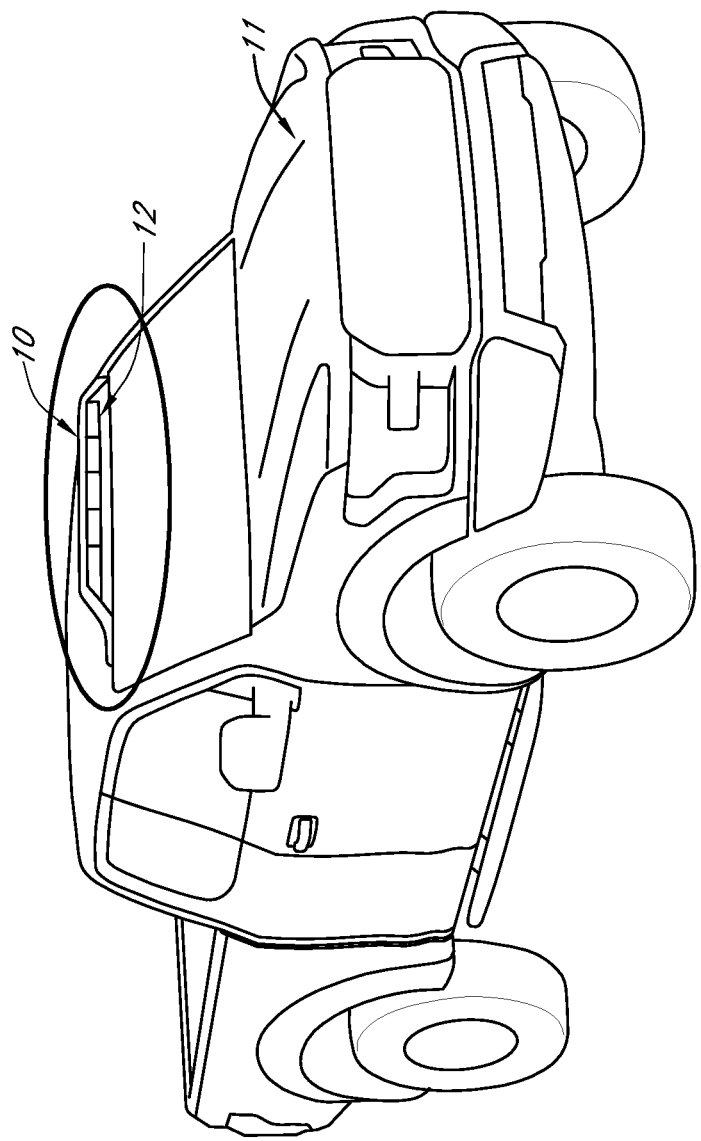

FIG. 9 is a perspective view of another embodiment of the invention disclosed configured as a vehicle bracket attached to a roof proximate the cab lights of the vehicle as disclosed herein.

| DETAILED DESCRIPTION - LISTING OF ELEMENTS | |
| --- | --- |
| Element Description | Element Number |
| Inner Bracket | 1 |
| Tab | 1a |
| Body | 1b |
| Opening | 1c |
| Interior body panel (rocker panel) | 2/2a |
| Fastener | 3 |
| Accessories/ Cover | 4 |
| Exterior body panel | 5 |
| | 6 |
| Rib | 7 |
| | 8 |
| Fastener (nut and bolt) | 9 |
| Vehicle accessory bracket | 10 |

-continued

DETAILED DESCRIPTION - LISTING OF ELEMENTS

| Element Description | Element Number |
|---|---|
| Vehicle (truck, standard car, SUV, mini van, etc. prior art) | 11 |
| Light (Roof lights/cab lights/ LED light bars, etc.- prior art) | 12 |
| | 13 |
| Affected areas (rusted/unsightly blemishes area) | 14 |
| | 15 |

DETAILED DESCRIPTION OF INVENTION

Before the present methods and apparatuses are disclosed and described, it is to be understood that the methods and apparatuses are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description.

Before the various embodiments of the present invention are explained in detail, it is to be understood that the invention is not limited in its application to the details of construction and the arrangements of components set forth in the following description. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

The following detailed description is of the best currently contemplated modes of carrying out illustrative embodiments of the invention. The description is not to be taken in a limiting sense, but is made merely for the purpose of illustrating the general principles of the invention, since the scope of the invention is best defined by the appending claims. Various inventive features are described below herein that can each be used independently of one another or in combination with other features.

Illustrative Embodiment and Advantages of Invention

Figure 1:
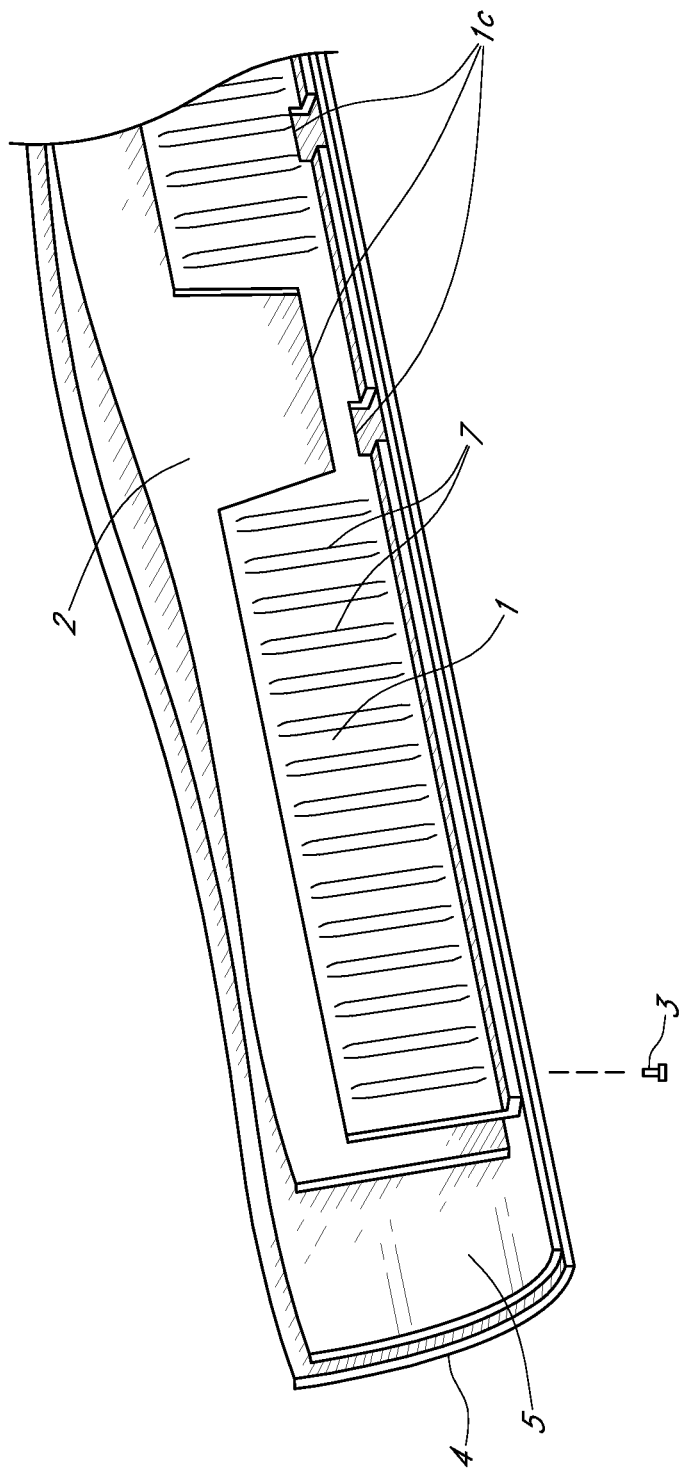
FIG. 1 is a perspective view of a vehicle accessory bracket for use in automotive applications as shown and disclosed herein.
Figure 2:
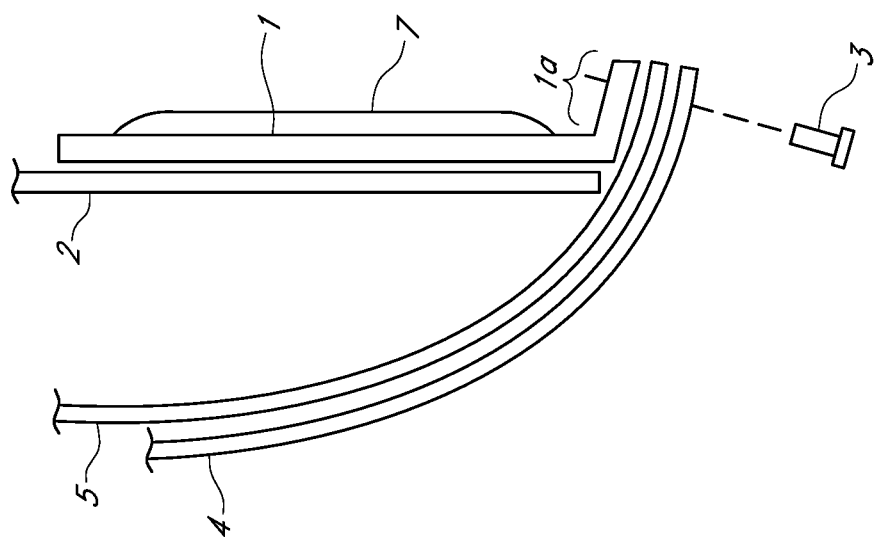
FIG. 2 is an end view of a vehicle accessory bracket of FIG. 1 mounted for use in automotive applications as disclosed herein.

The present disclosure relates to a vehicle accessory bracket 10. FIG. 1 is a perspective view of a vehicle accessory bracket 10 having an inner bracket 1 with multiple openings 1c therein as deployed for use in a vehicle application and particularly as shown in support of an interior body panel 2 for mounting an accessory 4 proximate the exterior body panel 5 of the vehicle 11. As shown ribs 7 are positioned across the inner bracket 1 surface to improve its strength. FIG. 2 is an end view of the mounted inner bracket 1 of FIG. 1 illustrating the accessory (cover) 4 positioned exterior and adjacent the exterior body panel 5, which is exterior the interior body panel 2. As shown the inner bracket 1 is mounted interior and adjacent the interior body panel 2. As shown, the lower interior portion of the inner bracket 1 is configured as tab 1a distending almost horizontal from the body of the inner bracket 1 which is close to vertical with fastener 3 inserted into and through the inner bracket 1 to hold the accessory 4 and the exterior body panel 5 in place. As will be discussed herein, the interior body panel 2 is illustrated in FIGS. 3-7 as a vehicle inner rocker panel 2. As one of ordinary skill will appreciate, the full scope of the vehicle accessory bracket and its method of use is not limited to the interior body panel 2 configured as rocker panel.

Figure 3A:
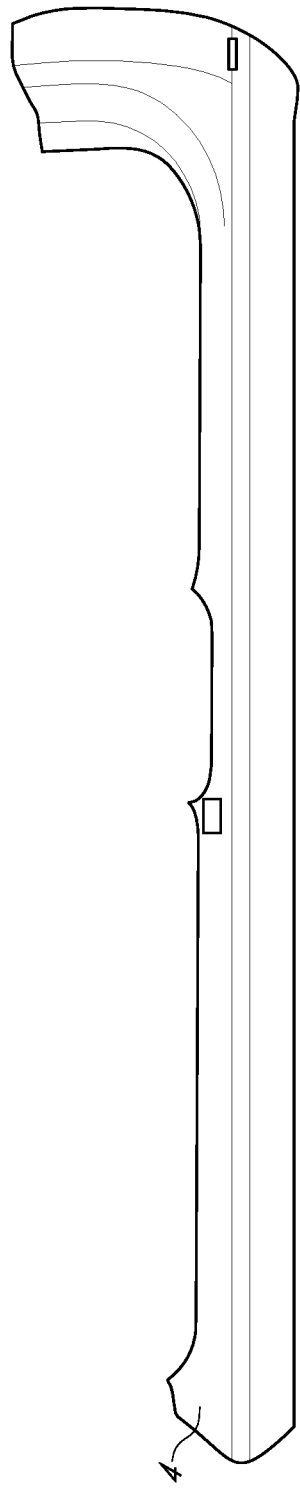
FIG. 3A is a perspective view of an accessory configured as a cover which may be mounted to a vehicle using the interior bracket wherein the rocker panel is positioned on the right side of the accessory as disclosed herein.
Figure 3B:
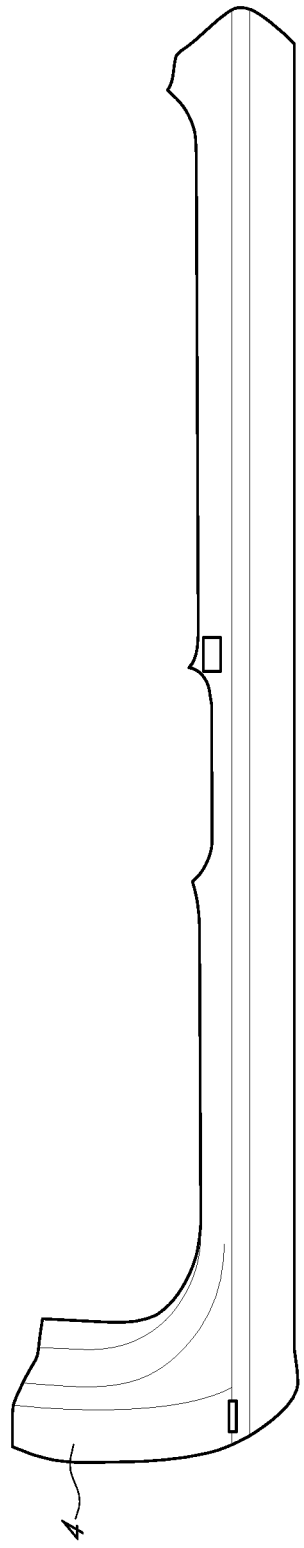
FIG. 3B is a perspective view of an accessory which may be mounted to a vehicle using the bracket wherein the rocker panel is positioned on the left side of the accessory as disclosed herein.

FIG. 3A is a perspective view of an accessory 4 (cover) which may be mounted to a vehicle 11 using the inner bracket 1 wherein the interior body panel 2 (rocker panel) is positioned on the right side of the accessory 4 as disclosed herein. FIG. 3B is a perspective view of an accessory which may be mounted to a vehicle exterior 11 using the vehicle accessory bracket 11 wherein the interior body panel 2 (shown as inner rocker panel) is positioned on the left side of the accessory 4 as disclosed herein. The accessory 4 (cover) as shown and disclosed in this embodiment may include additional features not limited to shape, size, color for different application purposes without any limitation and or restriction. The accessory 4 may be constructed from different materials such as plastic, acrylic, rubber but not limited to metal, such as steel, bronze and aluminum, or a combination therein, or some other solid, durable, hard material or a combination thereof.

FIG. 4A is a perspective view of an inner bracket 1 which may be mounted or installed to an existing structure of the vehicle 11 (truck) as disclosed herein. FIG. 4B is another perspective view of an inner bracket 1 which may be mounted or installed to an existing structure of the vehicle 11 (truck) as disclosed herein. As shown in FIGS. 4A and 4B, the inner bracket 1 is configured with a tab 1a, a body 1b and a plurality of openings 1c wherein the tab 1a may be positioned along the length of the body 1b of the inner bracket 1. As shown, the tab 1a is perpendicular with the body of the inner bracket 1. In another embodiment (not shown), the tab 1a may be positioned at a different position related to the body 1b of the inner bracket which may improve the ease of attaching the inner bracket 1 within the interior of the vehicle 11. Dependent on the size and shape of the existing structure of the vehicle 11, the angle between the body 1b of the inner bracket and the tab 1a may be adjusted which allows the vehicle accessory bracket 10 to fit tightly to the existing structure of the vehicle 11. A plurality of openings 1c on the bracket are designed to allow insertion of fasteners, such as rivets or metal screws and secure the accessory 4 (cover) and the vehicle bracket 10 to the existing structure with ease without any limitation and restriction. The bracket 1 may be constructed of, but not limited to, a metal, such as steel, bronze and aluminum, or a combination therein, or some other solid, durable, hard material or a combination thereof.

FIG. 5 is a perspective view of a vehicle bracket which may be mounted or installed to an existing structure of the truck (shown in arrow) to replace the rusted area (shown in circle) as disclosed herein. FIG. 6 is a demonstrative view of the method of installing a vehicle bracket 10 in an existing structure of a vehicle 11 as disclosed herein. As shown, the vehicle bracket 10 may be applied to any affected areas 14 (rusted/unsightly blemishes area) of the vehicle (including the roof lights (shown in FIG. 9), the truck bed (not shown) and fender flares (as shown later in FIG. 8) to cover and protect the vehicle 11 which further improve the safety of the operator and the passenger when entering and exiting the vehicle 11.

As illustrated in FIGS. 5 and 6, the method of installing the vehicle bracket 10 may comprise the following steps:

1. Identifying the affected areas 14 on the vehicle 11 wherein the affected area may be defined as rusting or rusted through areas along the exterior body panel 5 and the interior body panel 2, the body, the roof line, the roof light, the fender flares, etc.
2. Preparing the affected areas 14 as needed by removing loose rusted metal from the exterior body panel 5, and particularly the interior body panel 2, and treating the rusted sections with anti-rust paint or other corrosion inhibitor, as needed.
3. Inserting the inner bracket 1 interior to the existing interior structure of the vehicle defined as the interior body panel 2, proximate the affected area 14. As shown in FIGS. 5 and 6, the inner bracket 1 is positioned adjacent and interior the existing interior body panel 2 which is shown as a rocker panel 2a.
4. Inserting the accessory exterior 4 to the exterior body panel 5.
5. Securing the vehicle accessory bracket 10 to the existing structure of the vehicle 11 via a fastener 3 positioned into the accessory 4, the exterior body panel 5 and the inner bracket 1 at the tab portion of the inner bracket 1a, wherein all three components are co-adjacent.

Additional steps may be added or simplified to improve and facilitate the attachment of the vehicle bracket 10 to the existing structure of the vehicle 11. In another embodiment, the body panel 2 and the accessory 4 may be attachable/detachable or permanently affixed without any limitation and or restriction otherwise unless indicated in the following claims.

FIG. 7A is a perspective view of an existing structure of the vehicle 11 before installation of the accessories 4 wherein the vehicle bracket 10 (not shown) was installed or mounted to the bottom of the truck 11 in preparation for installation of the accessory 4 as disclosed herein. FIG. 7B is a perspective view of an existing structure of the vehicle 11 after the installation of the accessories 4 wherein the vehicle bracket 10 was installed or mounted to the bottom of the vehicle 11 as disclosed herein. One of ordinary skill will appreciate that the vehicle bracket 10 may provide a better support to the structure of the existing truck 11 and safety to the user (the operator and the passenger) when entering and exiting the vehicle 11. The vehicle may include truck, van, mini-van, car, SUV, etc. without any limitation and or restriction.

One of ordinary skill will appreciate that the rocker panel 2 may be substituted for other similar vehicle panels including a truck fender flare as shown in FIG. 8 and the upper cab light panel as shown in FIG. 9, dependent on the application without any limitation and or restriction unless otherwise indicated in the following claims.

One of ordinary skill will appreciate that the accessory 4 may be used as a cover and served multiple purposes such as protection of the internal bracket 1, decoration, support the vehicle 11 etc. but not limited to other purposes unless otherwise indicated in the following claims. One of ordinary skill will also appreciate that depending on the materials selected, the components of the vehicle bracket 10 can be constructed together or constructed separately and conventionally attached together.

FIG. 8 is a front view of a bracket wherein the bracket may be referred as flare bracket and may be installed at the truck side as disclose herein. FIG. 9 is a perspective view of a vehicle bracket 10 attached to a roof light of a vehicle 11 as disclosed herein. One of ordinary skill will appreciate that the vehicle bracket 10 may be used for different purposes and may be attached at different positions of the vehicle 11 such as vehicle bed, roof, light and door without any limitation or restriction unless otherwise indicated in the following claims.

As illustrated the attachment configuration does not require complex manufacturing; therefore, the production of the vehicle bracket 10 would be relatively economical and have a low maintenance cost. Additionally, as previously discussed the optimal configuration of the vehicle bracket 10 (e.g. length, diameter, shape, etc.) may vary from one application to the next and is therefore in no way limiting to the scope of the present disclosure unless so indicated in the following claims.

While certain specific embodiments have been described in detail, it is understood that the present disclosure will be appreciated by those skilled in the art and will be developed considering the overall teaching of the disclosure. Accordingly, the embodiments disclosed herein should not be construed as limitation on the scope of the invention, but should be determined by the appended claims and their legal equivalents.

As one of ordinary skill will appreciate the present disclosure is not limited by the means of construction or the materials chosen as other suitable materials, including plastic, steel or aluminum, and combinations therein.

It should be noted that particular embodiment are not limited to the specific embodiments pictured and described herein, but is intended to apply to all similar apparatuses and methods for providing the various benefits of those elements, which such benefits are explicitly and/or inherently disclosed herein. Modifications and alterations from the described embodiments will occur to those skilled in the art without departure from the spirit and scope of the vehicle bracket 10. Furthermore, variations and modifications of the foregoing are within the scope of the vehicle bracket 10. It is understood that the vehicle bracket 10 as disclosed herein extends to all alternative combinations of one or more of the individual features mentioned, evident from the text and/or drawings, and/or inherently disclosed. All of these different combinations constitute various alternative aspects of the vehicle bracket 10. The embodiments described herein explain the best modes known for practicing the vehicle bracket 10 and will enable others skilled in the art to utilize the same. The claims are to be construed to include alternative embodiments to the extent permitted by the prior art.

Having described preferred aspects of the various methods and apparatuses, other features of the present disclosure will undoubtedly occur to those versed in the art, as will numerous modifications and alterations in the embodiments as illustrated herein, all of which may be achieved without departing from the spirit and scope of the present disclosure. Accordingly, the methods and embodiments pictured and described herein are for illustrative purposes only, and the scope of the present disclosure extends to all method and/or structures for providing the various benefits and/or features of the present disclosure and/or components thereof unless so indicated in the following claims. Furthermore, the methods and embodiments pictured and described herein are no way limiting to the scope of the present disclosure unless so stated in the following claims.

Any dimensions provided herein are for illustrative purposes only and in no way limit the scope of the present disclosure unless so indicated in the following claims. It should be noted that the present disclosure and/or components thereof are not limited to the specific embodiments pictured and described herein, but are intended to apply to all similar apparatuses and methods for providing a predictive design analysis in a virtual environment. Modifications and alterations from the described embodiments will occur to those skilled in the art without departure from the spirit and scope of the present disclosure.

Any of the various features, components, functionalities, advantages, aspects, configurations, etc. for the present disclosure may be used alone or in combination with one another depending on the compatibility of the features. Accordingly, a nearly infinite number of variations of the present disclosure exists. Modifications and/or substitutions of one feature, component, functionality, aspect, configuration, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

While the present disclosure has been described in connection with preferred aspects and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The invention claimed is:

1. A vehicle bracket comprising:
    a) a bracket having a first end and a second end, wherein the bracket is configured to be placed over and adjacent a vehicle panel of a vehicle, wherein the vehicle panel has a first end and a second end and a shape;
    b) a body panel having a first end and a second end, the body panel positioned exterior the bracket and the vehicle panel; and,
    c) an accessory having a first end and a second end, the accessory positioned exterior and adjacent the body panel, wherein the accessory has a shape similar to the body panel shape.

2. The vehicle bracket according to claim 1 wherein the bracket has a plurality of openings.

3. The vehicle bracket according to claim 2 wherein a fastener is positioned in at least one of the plurality of openings.

4. The vehicle bracket according to claim 2 wherein the plurality of openings in the bracket provide support of the vehicle panel for mounting an accessory proximate the body panel.

5. The vehicle bracket according to claim 1 wherein the bracket is mounted or installed directly to an existing structure of a vehicle.

6. The vehicle bracket according to claim 1 wherein the vehicle panel is positioned between the bracket and the body panel.

7. The vehicle bracket according to claim 1 wherein the shape of the body panel is curved and is configured to engage with a curve shaped portion of the accessory.

8. The vehicle bracket according to claim 1 wherein the curve portion of the body panel is configured to engage with an existing structure of a vehicle.

9. The vehicle bracket according to claim 1 wherein the first end of the vehicle panel extends fully and longer than the first end of the bracket.

10. The vehicle bracket according to claim 1 wherein the accessory is configured as a cover.

11. The vehicle bracket according to claim 1 wherein a rivet is used to secure the bracket and the body panel together.

12. The vehicle bracket according to claim 1 wherein a rivet is used to secure the tap portion of the bracket and the second end of the body panel.

13. The vehicle bracket according to claim 1 wherein a rivet is used to secure the bracket, the body panel and the accessory together.

14. The vehicle bracket according to claim 1 wherein a rivet is used to secure a portion of the bracket, the second end of the body panel and the second end of the accessory together.

15. The vehicle bracket according to claim 1 wherein a rib is positioned across the bracket surface to improve the strength of the bracket.

16. A method for installing a vehicle bracket to an existing structure of a vehicle comprising:
   a) installing a vehicle bracket to an existing structure of a vehicle wherein the vehicle bracket comprises:
      i. an inner bracket having a first end and a second end and the inner bracket is configured with a plurality of openings;
      ii. positioning the inner bracket adjacent to and over a vehicle panel of the vehicle, wherein the vehicle panel has a first end and a second end;
      iii. an exterior body panel having a first end and a second end, the exterior body panel positioned exterior the inner bracket and the vehicle, the exterior body panel forms a portion between the body panel and the vehicle panel, the body panel is configured as a protective cover; and,
      iv. an accessory having a first end and a second end, the accessory positioned exterior and adjacent the body panel;
   b) inserting a rivet at the bracket, the second end of the body panel and the second end of the accessory;
   c) securing the vehicle bracket to the existing structure of the vehicle.

17. The method for installing a vehicle bracket to an existing structure of a vehicle according to claim 16 wherein the bracket is mounted or installed directly to the existing structure of the vehicle.

18. A vehicle accessory bracket for attachment of an accessory to a vehicle, the vehicle accessory bracket comprising:
   a) an inner bracket having a first end and a second end; and,
   b) an accessory having a first end and a second end, wherein the inner bracket is configured to be positioned interior to and adjacent an interior body panel of a vehicle and wherein an exterior body panel is positioned exterior and adjacent the interior body panel, the accessory configured to be positioned adjacent and exterior of the exterior body panel, wherein a fastener may be positioned into and through the accessory, the exterior body panel and the inner bracket to secure the vehicle accessory bracket to the vehicle.

* * * * *